US011686428B2

(12) United States Patent
Ben-Avi et al.

(10) Patent No.: US 11,686,428 B2
(45) Date of Patent: Jun. 27, 2023

(54) TELESCOPIC POLE LOCKING AND DAMPING MECHANISM

(71) Applicant: KETER HOME AND GARDEN PRODUCTS LTD, Herzliya (IL)

(72) Inventors: Ehud Ben-Avi, Kibbutz Gazit (IL); Hadar Amiran, Timrat (IL)

(73) Assignee: KETER HOME AND GARDEN PRODUCTS LTD, Herzliya (IL)

( * ) Notice: Subject to any disclaimer, the term of this patent is extended or adjusted under 35 U.S.C. 154(b) by 0 days.

(21) Appl. No.: 17/753,236

(22) PCT Filed: Aug. 5, 2020

(86) PCT No.: PCT/IL2020/050855
§ 371 (c)(1),
(2) Date: Feb. 24, 2022

(87) PCT Pub. No.: WO2021/038554
PCT Pub. Date: Mar. 4, 2021

(65) Prior Publication Data
US 2022/0290803 A1     Sep. 15, 2022

(30) Foreign Application Priority Data

Aug. 28, 2019  (IL) .......................... 268972

(51) Int. Cl.
| F16M 11/00 | (2006.01) |
| F16M 11/26 | (2006.01) |
| A47B 9/20 | (2006.01) |
| A47B 85/06 | (2006.01) |
| F25D 3/08 | (2006.01) |

(52) U.S. Cl.
CPC ............... *F16M 11/26* (2013.01); *A47B 9/20* (2013.01); *A47B 85/06* (2013.01); *A47B 2200/0052* (2013.01); *F25D 3/08* (2013.01)

(58) Field of Classification Search
CPC .......... F16M 11/26; A47B 9/20; A47B 85/06; A47B 2200/0052; F25D 3/08; F16B 7/105; B25G 1/04
See application file for complete search history.

(56) References Cited

U.S. PATENT DOCUMENTS

| 3,712,652 | A | * | 1/1973 | Uilkema | F16B 7/105 |
| | | | | | 248/188.5 |
| 4,385,849 | A | | 5/1983 | Crain | |
| 4,834,413 | A | * | 5/1989 | Patel | F16B 7/042 |
| | | | | | 280/281.1 |
| 5,149,092 | A | * | 9/1992 | Parsons | F41B 15/027 |
| | | | | | 463/47.7 |
| 5,352,057 | A | * | 10/1994 | Zody | F16B 7/105 |
| | | | | | 403/321 |
| 5,375,938 | A | | 12/1994 | Bartlow | |
| 5,595,410 | A | * | 1/1997 | Wilson | F16B 2/246 |
| | | | | | 292/259 R |

(Continued)

FOREIGN PATENT DOCUMENTS

| CN | 101493109 A | 7/2009 |
| CN | 104728230 A | 6/2015 |

*Primary Examiner* — Amy J. Sterling
(74) *Attorney, Agent, or Firm* — Vorys, Sater, Seymour and Pease LLP; Anthony P. Venturino; Maryellen Feehery Hank

(57) ABSTRACT

Provided is a telescopic pole assembly, and a locking and damping assembly therefore.

22 Claims, 13 Drawing Sheets

(56) References Cited

U.S. PATENT DOCUMENTS

| | | | |
|---|---|---|---|
| 6,453,777 B1* | 9/2002 | Newman | B25B 11/007 |
| | | | 81/53.11 |
| 6,938,927 B1* | 9/2005 | Martin | A63C 11/221 |
| | | | 135/69 |
| 7,237,305 B2* | 7/2007 | Newman | B25G 1/04 |
| | | | 16/427 |
| 7,516,988 B2* | 4/2009 | Lin | A47L 9/244 |
| | | | 285/302 |
| 7,908,977 B2 | 3/2011 | Zak et al. | |
| 8,025,455 B2* | 9/2011 | Huang | F16B 7/1418 |
| | | | 482/121 |
| 8,376,646 B2* | 2/2013 | Melino, Sr. | F16B 7/1454 |
| | | | 403/322.4 |
| 10,051,930 B2* | 8/2018 | Heim | A45B 9/00 |
| 10,245,719 B2 | 4/2019 | Wood et al. | |
| 10,856,685 B2* | 12/2020 | Wolf | A47G 27/0493 |
| 2006/0062632 A1* | 3/2006 | Jang | F16B 7/105 |
| | | | 403/378 |
| 2022/0025997 A1* | 1/2022 | Liao | F16L 33/04 |
| 2022/0362922 A1* | 11/2022 | Tata | F16B 7/105 |

\* cited by examiner

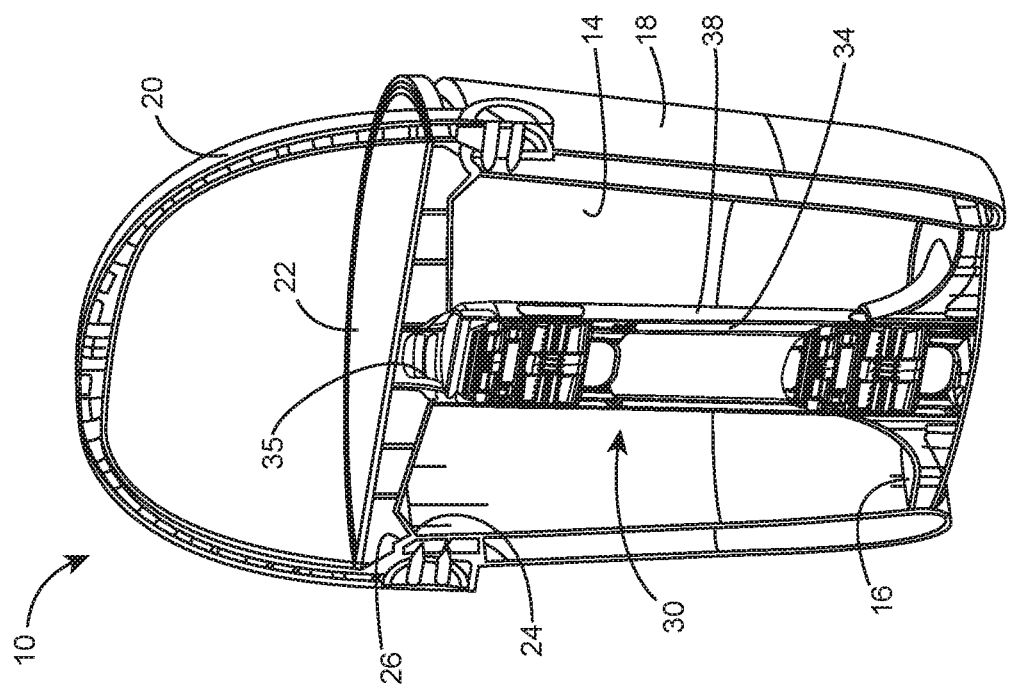
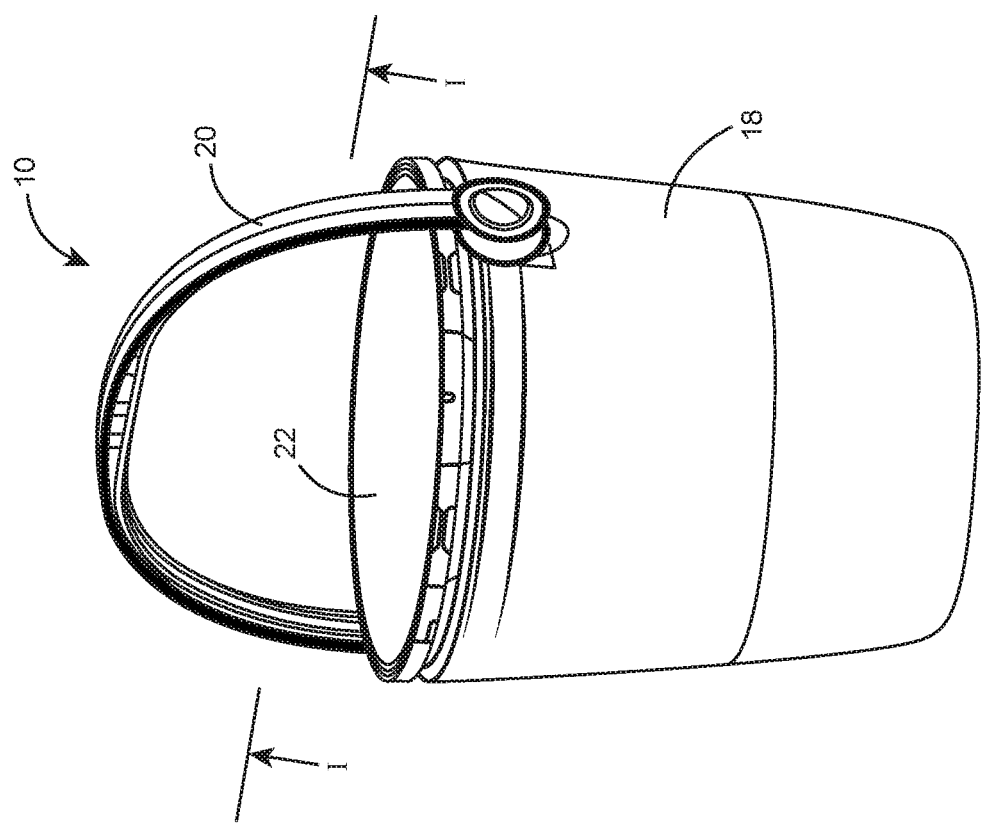
FIG. 1B
FIG. 1A

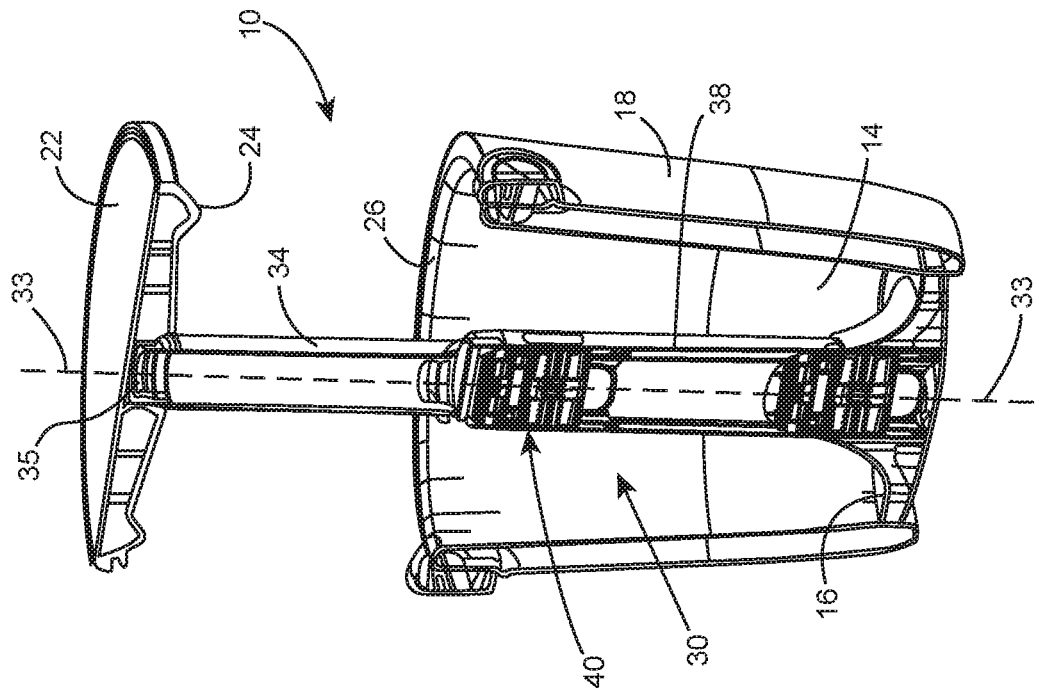
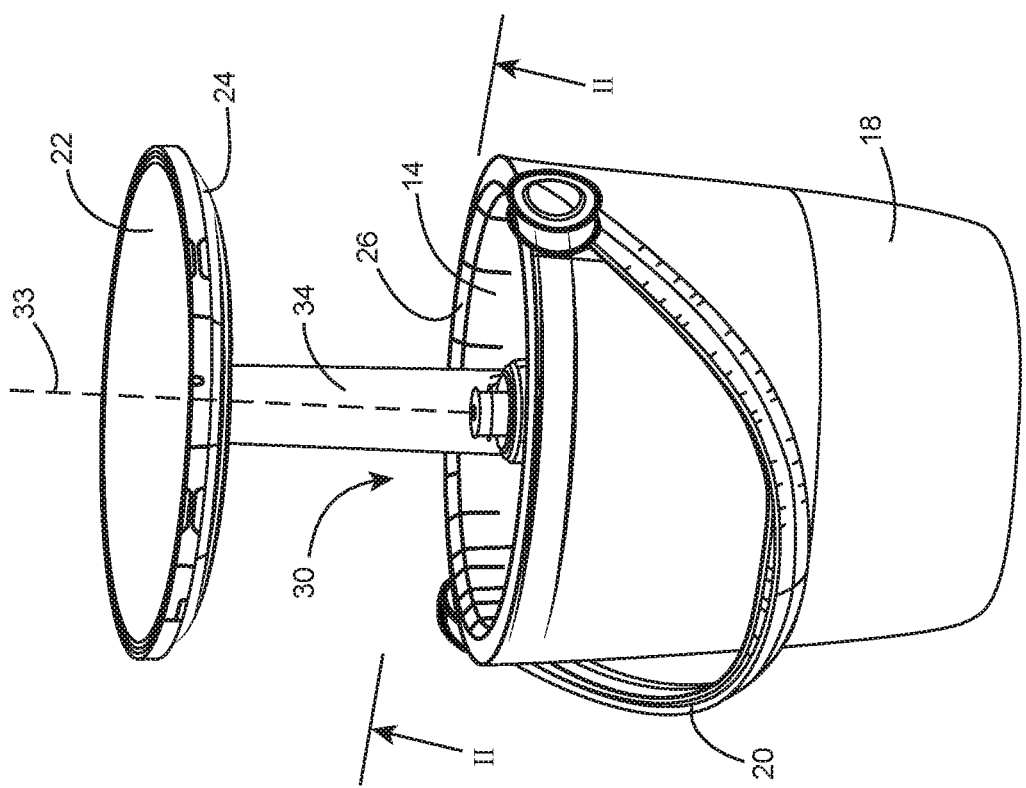

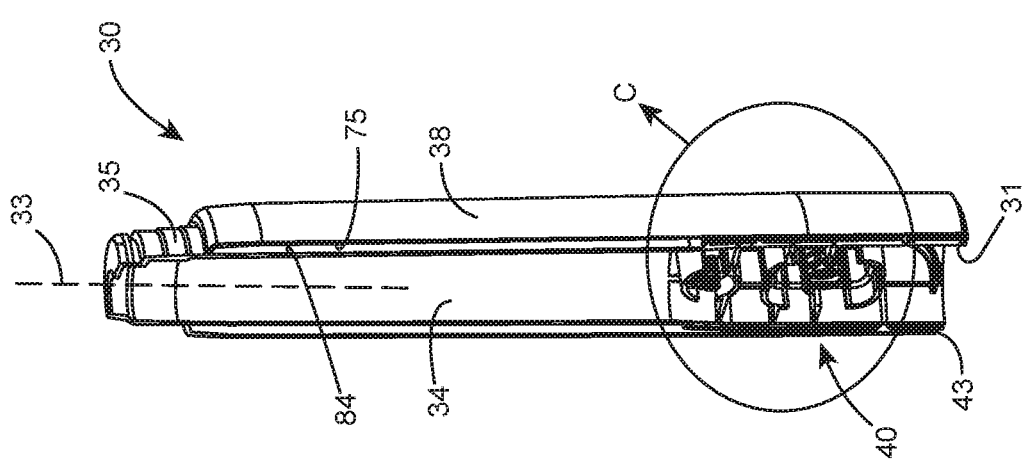

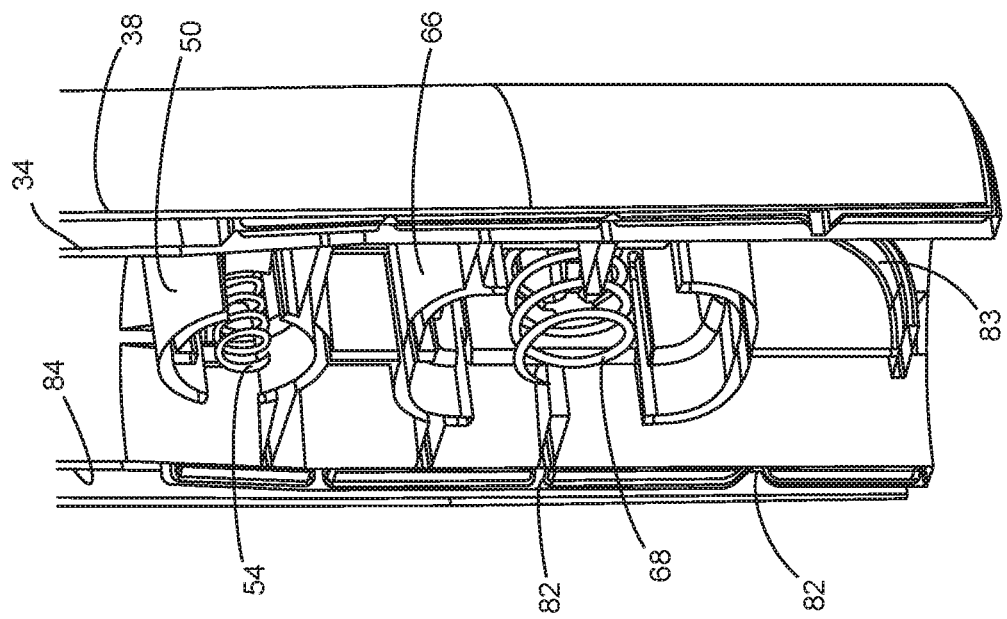
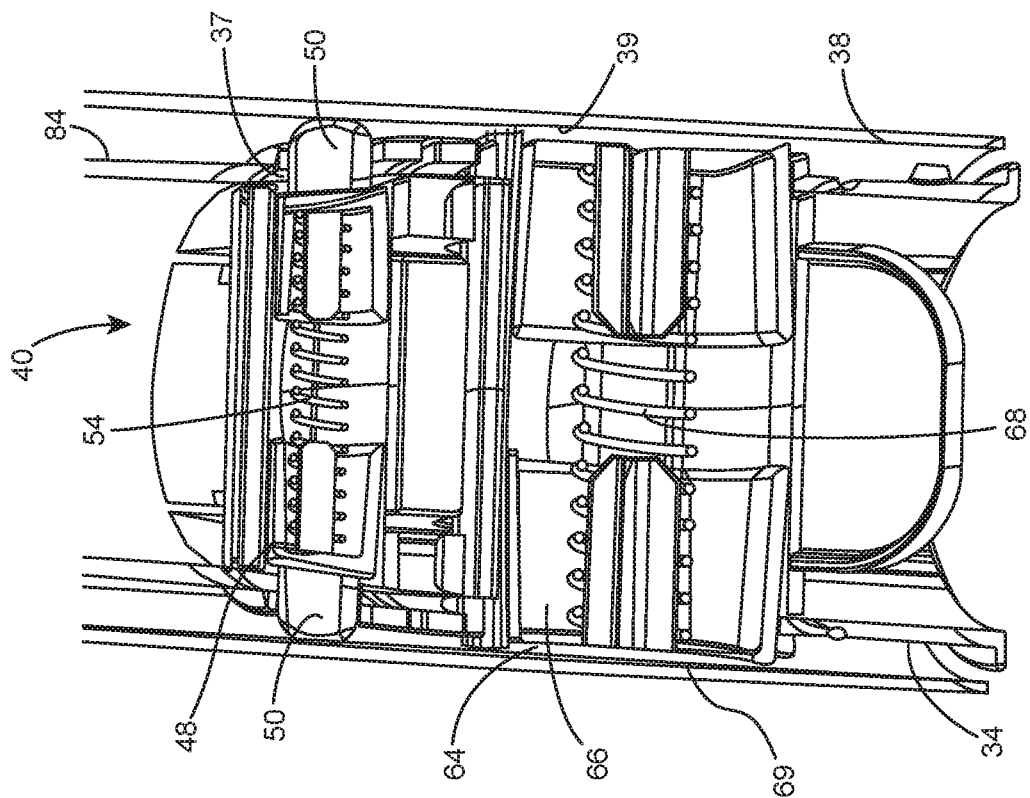
FIG. 3E
FIG. 3D

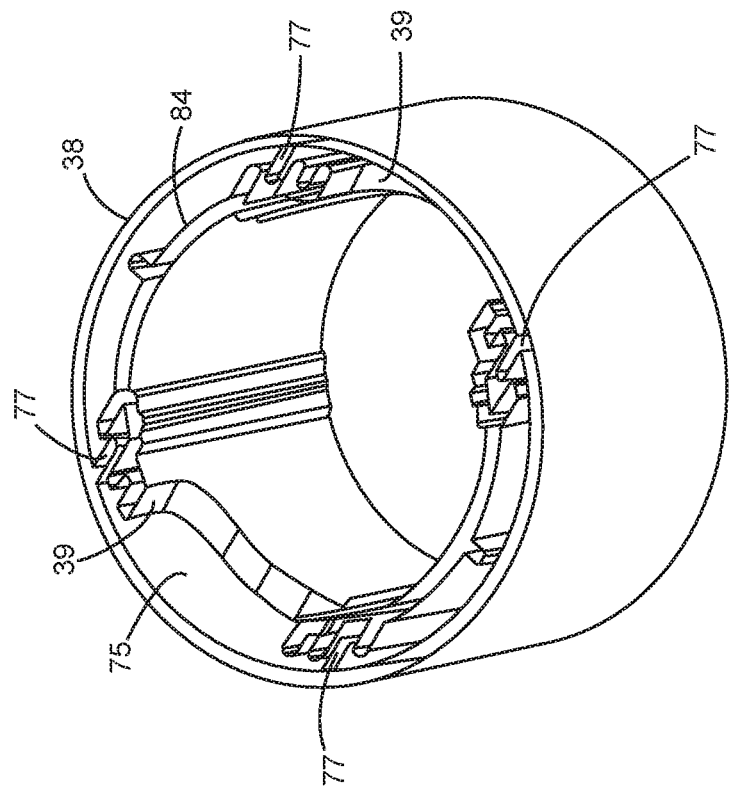
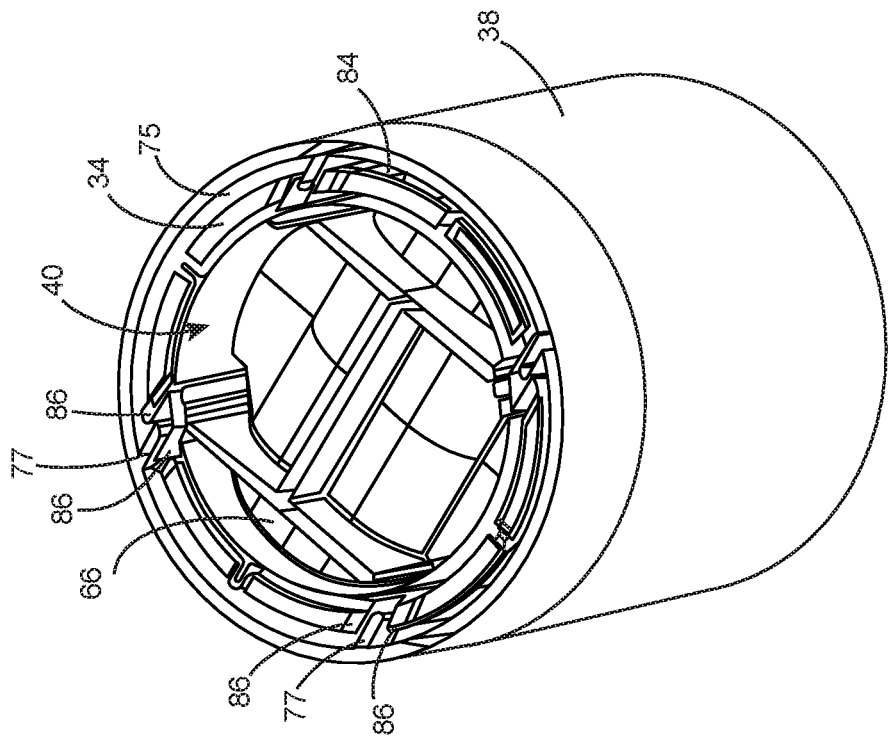
FIG. 4B
FIG. 4A

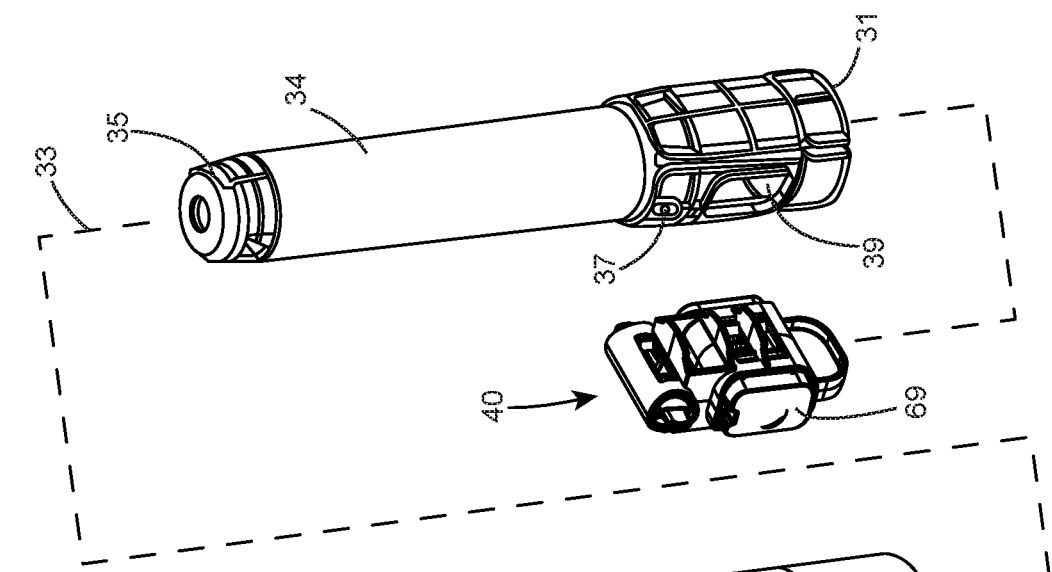
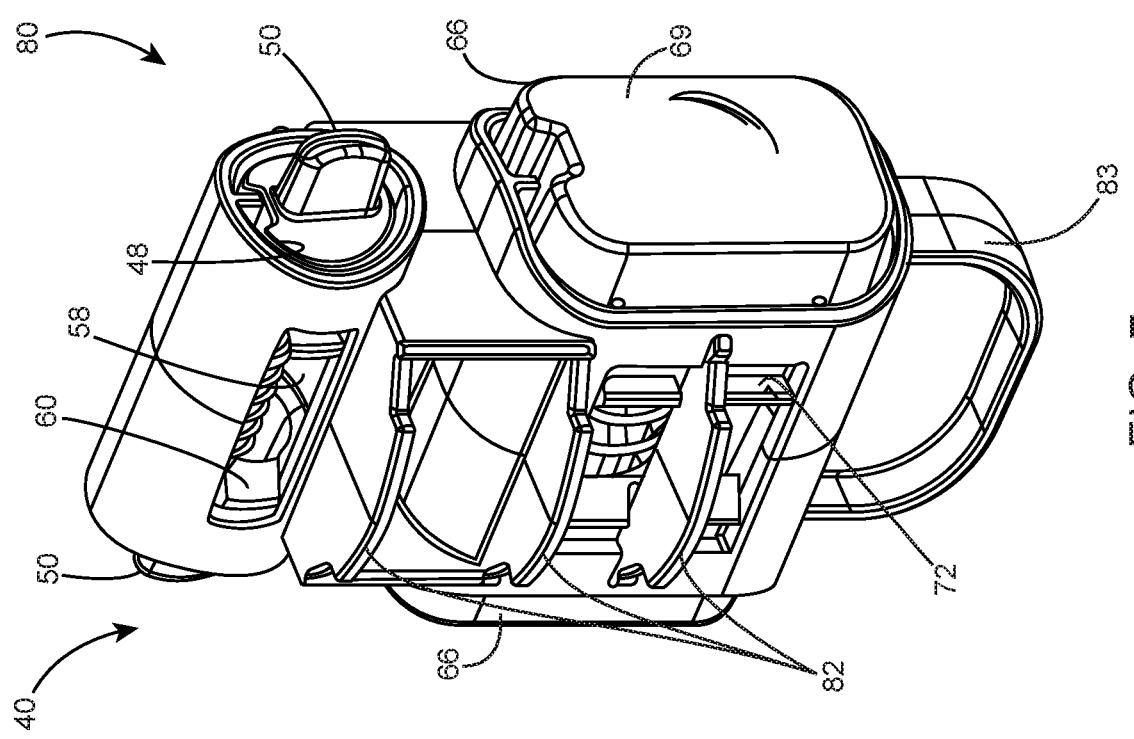
FIG. 8
FIG. 7

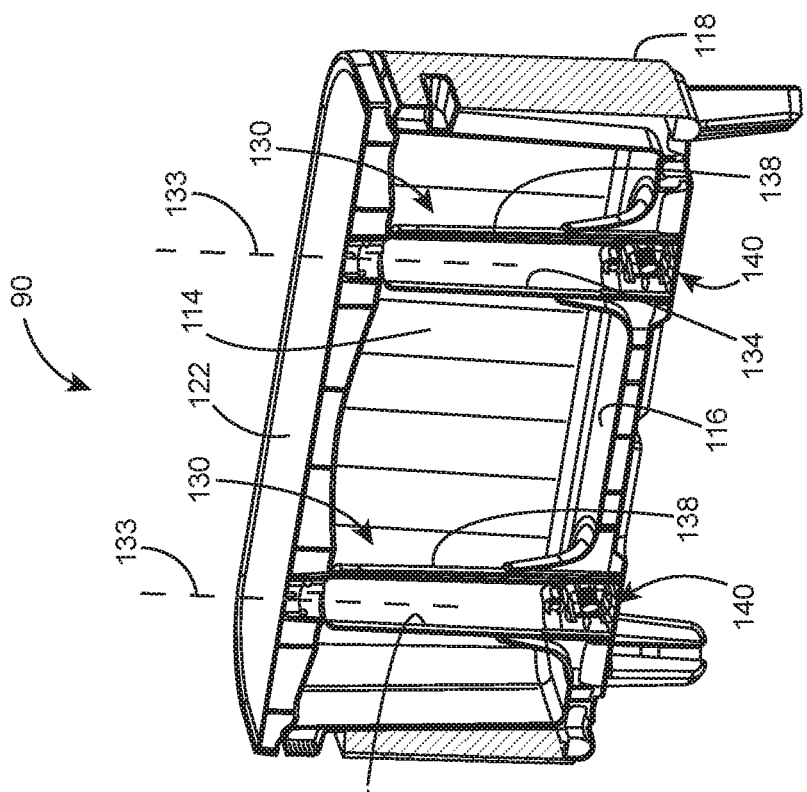
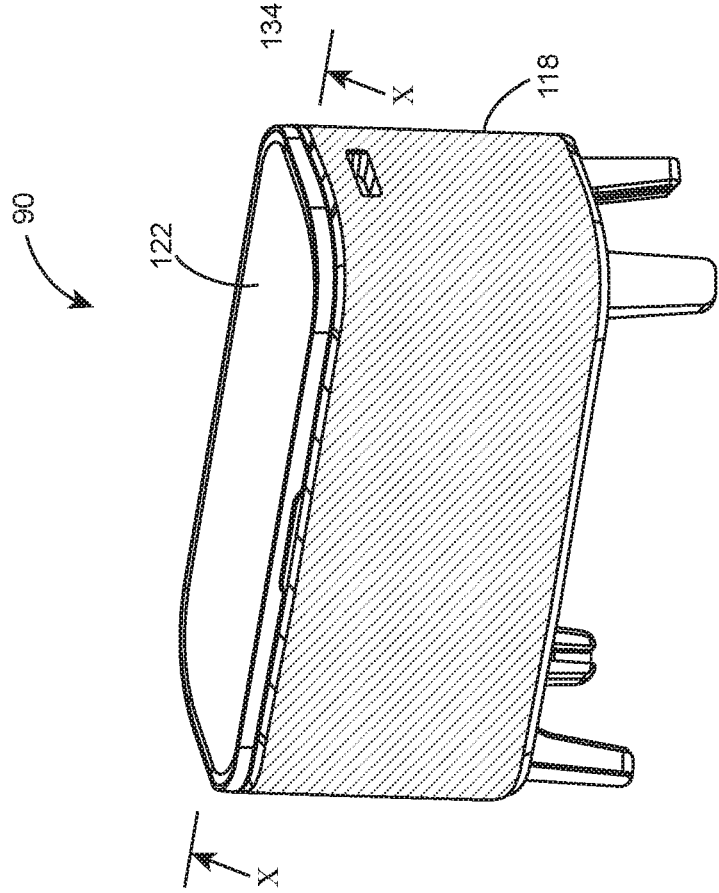
FIG. 9A
FIG. 9B

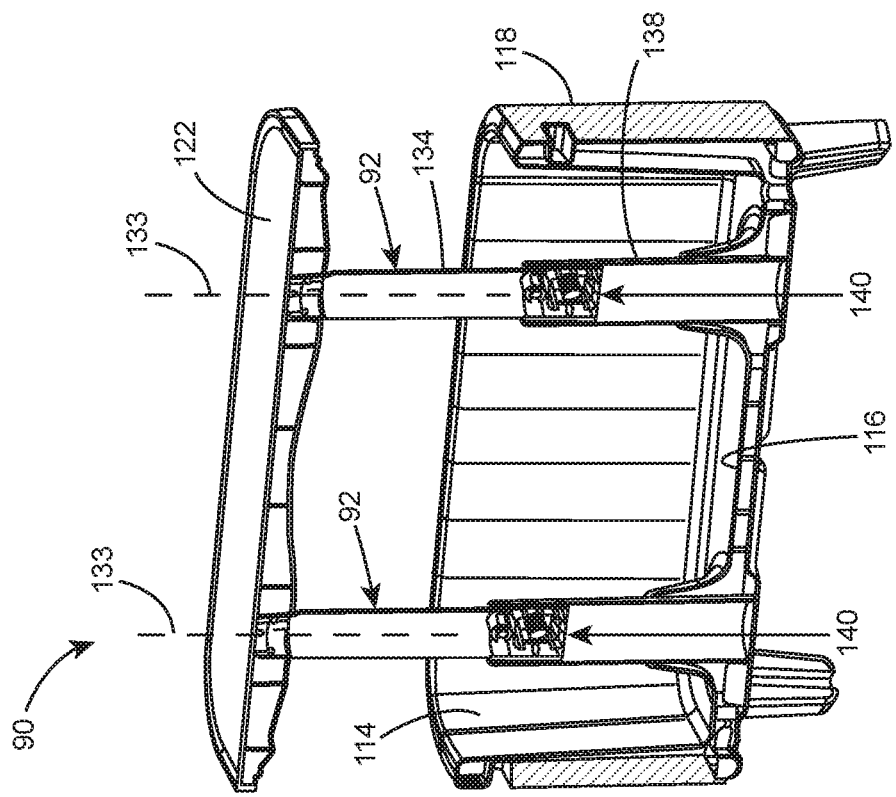
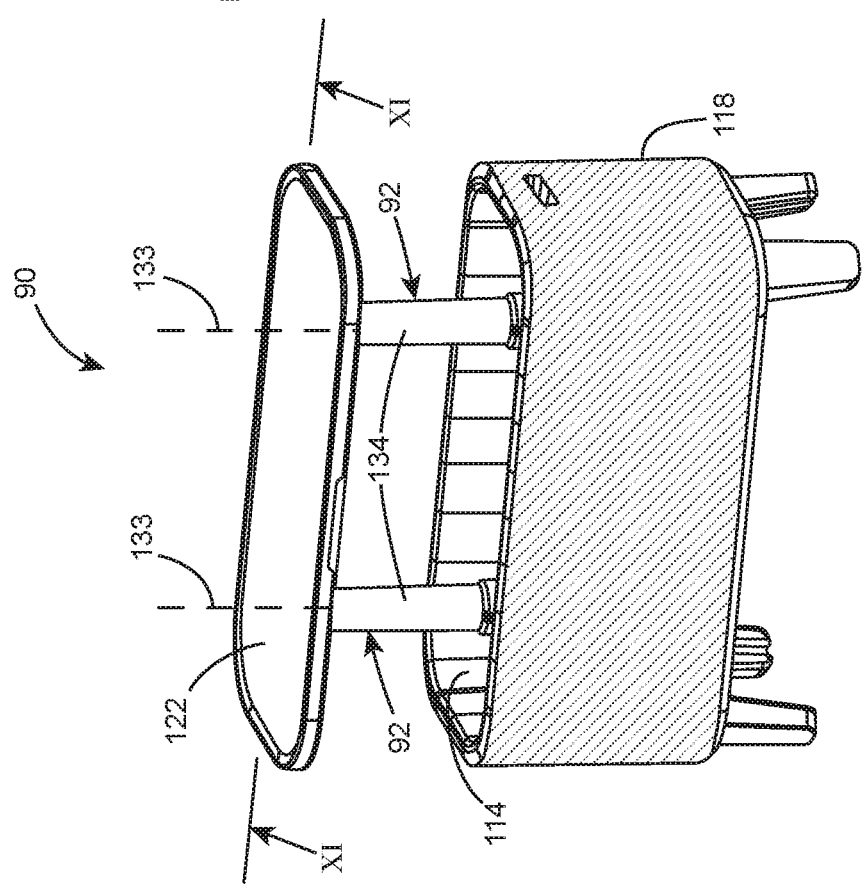
FIG. 10B
FIG. 10A

TELESCOPIC POLE LOCKING AND DAMPING MECHANISM

TECHNOLOGICAL FIELD

The present disclosure concerns a telescopic pole assembly, and more particularly the disclosure concerns a locking and damping assembly therefore.

BACKGROUND ART

References considered to be relevant as background to the presently disclosed subject matter are listed below:
 U.S. Pat. No. 5,375,938
 U.S. Pat. No. 10,245,719
Acknowledgement of the above references herein is not to be inferred as meaning that these are in any way relevant to the patentability of the presently disclosed subject matter.

BACKGROUND

U.S. Pat. No. 5,375,938 discloses an interior sleeve for a pair of telescoping tubular members, in which the sleeve is mounted in an outer tubular member. The sleeve has locking studs on its exterior surface which are aligned with locking apertures in the outer tubular member. The sleeve has an annular flange disposed on the outer end of the sleeve to abut to the outer end of the outer tubular member and a longitudinal slot to allow compression of the sleeve to fit into the tubular member.

U.S. Pat. No. 10,245,719 discloses a telescoping utility line pole is disclosed. The pole includes an outer pole section configured to be held in the hand of a user and having an inner bore defined by an inner surface and an inner pole section configured to slide within the bore of the outer pole section. The outer pole section includes a plurality of grooves defined by a plurality of raised sections positioned around a circumference of the inner surface. The inner pole section includes a plurality of lugs positioned on a distal end of the inner pole section. The plurality of lugs and plurality of grooves are keyed to each other. When the plurality of lugs are aligned with the plurality of grooves, the inner pole section is permitted to engage the outer pole section for use by the user.

GENERAL DESCRIPTION

According to a first aspect of the present disclosure there is provided a combined locking and damping mechanism for use in conjunction with a telescopic pole assembly.

The locking and damping mechanism according to the present disclosure comprises a housing articulable at a bottom portion of an inner segment of a telescopic tubular couple, said housing comprising a locking stud chamber accommodating at least one locking stud that is biased to laterally project from the housing and configured for arresting within a locking opening at a top portion of an outer segment of the telescopic tubular couple, and a damping chamber accommodating at least one friction enhancing member normally projecting from the housing and configured for sliding engagement about an inside surface of the outer segment of the telescopic tubular couple.

A second aspect of the disclosure is directed to a telescopic pole assembly configured with a combined locking and damping mechanism, said telescopic pole assembly comprising at least a telescopic tubular couple configured with an inner segment slidingly received through an outer segment of the telescopic tubular couple; and a locking and damping mechanism comprising a housing articulated at a bottom portion of the inner segment, said housing comprises a locking stud chamber accommodating at least one locking stud biased to laterally project from the housing through a stud opening disposed in register at the bottom portion of the inner segment, and a damping chamber accommodating at least one friction enhancing member normally projecting from the housing and configured for sliding engagement about an inside surface of the outer segment; and said telescopic tubular couple is configurable between a closed position at which the inner segment is retraced and at least partially received within the outer segment and wherein the at least one locking stud is disengaged from a locking opening at the outer segment, though remains projecting through the stud opening; and at least one open, expanded position, at which the inner segment is at least partially withdrawn from the outer segment and wherein the at least one locking stud is engaged within the locking opening at a top portion of the outer segment; and wherein displacing the telescopic tubular couple between the open position and the closed position entails friction forces between the at least one friction enhancing member and the inside surface of the outer segment.

A third aspect of the disclosure is directed to a utility unit comprising at least one telescopic pole assembly configured with a combined locking and damping mechanism, said telescopic pole assembly comprising at least a telescopic tubular couple configured with an inner segment slidingly received through an outer segment of the telescopic tubular couple; and a locking and damping mechanism comprising a housing articulated at a bottom portion of the inner segment, said housing comprising a locking stud chamber accommodating at least one locking stud biased to laterally project from the housing through a stud opening disposed in register at the bottom portion of the inner segment, and a damping chamber accommodating at least one friction enhancing member normally projecting from the housing and configured for sliding engagement about an inside surface of the outer segment; and said telescopic tubular couple is configurable between a closed position at which the inner segment is retraced and at least partially received within the outer segment and wherein the at least one locking stud is disengaged from a locking opening at the outer segment, though remains projecting through the stud opening, and at least one open, expanded position, at which the inner segment is at least partially withdrawn from the outer segment and wherein the at least one locking stud is engaged within the locking opening at a top portion of the outer segment; and wherein displacing the telescopic tubular couple at least between the open position and the closed position entails friction forces between the at least one friction enhancing member and the inside surface of the outer segment.

The arrangement is such that friction forces upon displacement of the telescopic tubular couple into at least the closed position generate friction forces caused by the at least one friction enhancing member displacing against the inside surface of the outer segment, resulting in damping the axial displacement speed and preventing spontaneous displacement of the inner segment with respect to the outer segment.

Locking of the telescopic tubular couple at the open position is spontaneously facilitated by snap engagement of the at least one stud into the locking openings configured at the outer segment, wherein such locking takes place upon axial extraction of the inner segment with respect to the outer segment, however when the locking stud extends opposite and in register with the locking opening and with the stud opening. At the locked position, when the at least one stud is arrested within the locking opening, axial displacement of the inner segment with respect to the outer segment is prevented.

Unlocking the telescopic tubular couple takes place by depressing the at least one stud projecting through the locking opening so as to disengage therefrom, however not beyond the stud opening, thereby facilitating axial displacement of the inner segment with respect to the outer segment.

Any one or more of the following features, designs and configurations can be implemented in any of the aspects of the present disclosure, solely or in various combinations thereof:

- The locking stud chamber can be configured with two coaxially disposed locking studs, laterally biased at opposite directions;
- The damping chamber can be configured with two coaxially disposed friction enhancing members, laterally biased at opposite directions;
- The at least one locking stud can be displaceable along a first axis intersecting a longitudinal axis of the telescopic tubular couple;
- The at least one friction enhancing member can be displaceable along a second axis intersecting a longitudinal axis of the telescopic tubular couple;
- The first axis and the second axis can extend parallel to one another;
- The first axis and the second axis can extend coplanar;
- The first axis and the second axis can intersect one another, and both extend normal to the longitudinal axis of the telescopic tubular couple;
- The housing can comprise external support ribs configured to position and stabilize the housing within the bottom portion of an inner segment of a telescopic tubular couple;
- The at least one locking stud can be configured for sliding displacement between a normally outward projecting position, and a retracted position;
- The at least one locking stud can be configured for snap mounting within the housing;
- At an assembled position, at least the locking stud chamber of the housing of the locking and damping mechanism can be disposed within the inner segment of a telescopic tubular couple, wherein the inner segment is configured with a corresponding stud opening for each of the at least one locking studs, said stud openings disposed in register with the locking studs;
- The housing can be articulated within the bottom portion of an inner segment of a telescopic tubular couple, by the at least one locking stud projecting through the stud opening at the bottom portion of the inner segment;
- At an assembled position, the damping chamber can be disposed within the inner segment of a telescopic tubular couple, whereby the inner segment is configured with a corresponding opening for each of the at least one friction enhancing member, said openings disposed in register with the friction enhancing member;
- A utility unit according to the disclosure, can be any article, such as, for example, a furniture item, a support structure, etc. Examples of furniture items can be a cooler box with a supported top, a parasol, etc.
- The at least one locking stud can be biased into lateral projection by a coiled spring disposed within the locking stud chamber;
- The at least one locking stud can be biased into lateral projection by a stud spring disposed within the locking stud chamber of the housing;
- The at least one friction enhancing member can be biased into lateral projection by a friction enhancing spring disposed within the damping chamber of the housing;
- The at least one friction enhancing member can be configured with a friction enhancing portion configured for engaging the inside surface of the outer segment of the telescopic tubular couple, said friction enhancing portion can be configured as a surface portion extending parallel to said inside surface of the outer segment;
- The telescopic tubular couple can be configured with an aligning arrangement for preventing rotation of any one of the inner segment and the outer segment about the longitudinal axis of the telescopic tubular couple
- The housing can be configured with at least a portion having a cross-section similar to the bottom portion of the inner segment, and configured for snug receiving therein;
- During axial displacement of the inner segment into the open, extended position, the at least one locking stud slidingly displaces along at least a portion of the inside surface of the outer segment, until it snaps into locking engagement within the corresponding locking opening;
- The housing of the locking and damping mechanism can be integral with or articulatable to the inner segment of a telescopic tubular couple;
- A pair of oppositely disposed locking studs can be configured, coaxially disposed within the locking stud chamber and operating in opposite senses against a common biasing member;
- A pair of oppositely disposed friction enhancing members can be configured, coaxially disposed within the damping chamber and operating in opposite senses against a common biasing member.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A is a top perspective view of a utility unit, namely a cooler bar, according to an example of the disclosure, the cooler bar at its closed position;

FIG. 1B is a longitudinal section along line I-I in FIG. 1A;

FIG. 2A illustrates the cooler bar of FIG. 1A at its open position;

FIG. 2B is a longitudinal section along line II-II in FIG. 2A;

FIG. 3C is a longitudinal section along line IV-IV in FIG. 3A;

FIG. 3D is an enlargement of the portion marked B in FIG. 3B;

FIG. 3E is an enlargement of the portion marked C in FIG. 3C;

FIG. 4A is a longitudinal section along line V-V in FIG. 3A;

FIG. 4B is a longitudinal section along line VI-VI in FIG. 3A;

FIG. 7 is an isometric view of another example of a combined locking and damping mechanism according to the disclosure;

FIG. 8 is an exploded isometric view of a telescopic tubular couple according to an example of the disclosure;

FIG. 9A is a perspective view of a utility item being a cooler bar, according to yet an example of the disclosure, the cooler bar at its open position;

FIG. 9B is a longitudinal section along line X-X in FIG. 9A;

FIG. 10A is a perspective view of the cooler bar of FIG. 9A, at its open position; and FIG. 10B is a longitudinal section along line XI-XI in FIG. 10A.

DETAILED DESCRIPTION OF EMBODIMENTS

Figure 3B:
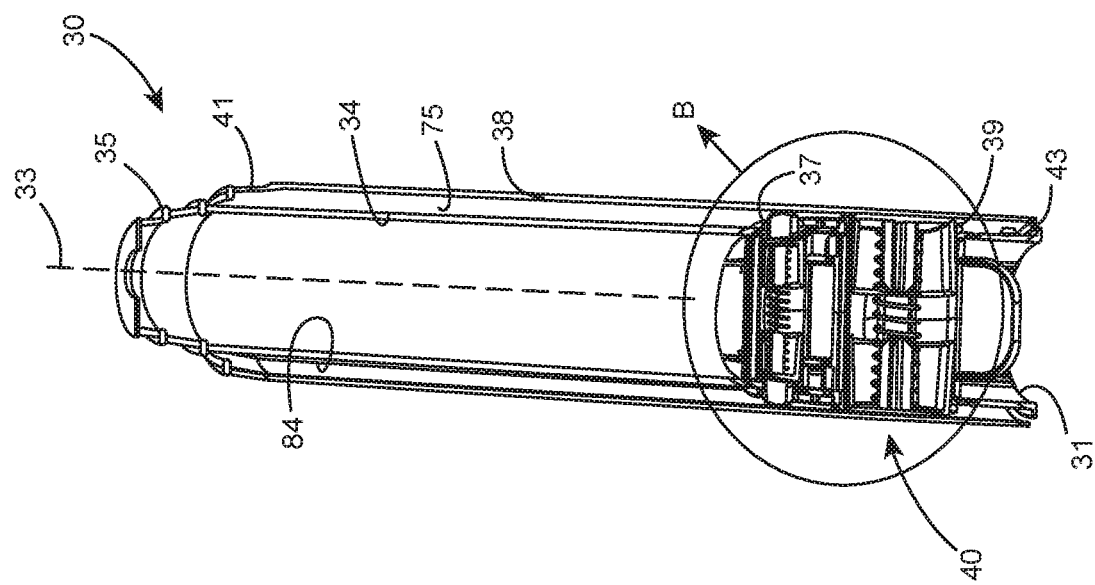
FIG. 3B is a longitudinal section along line III-III in FIG. 3A.
Figure 3A:
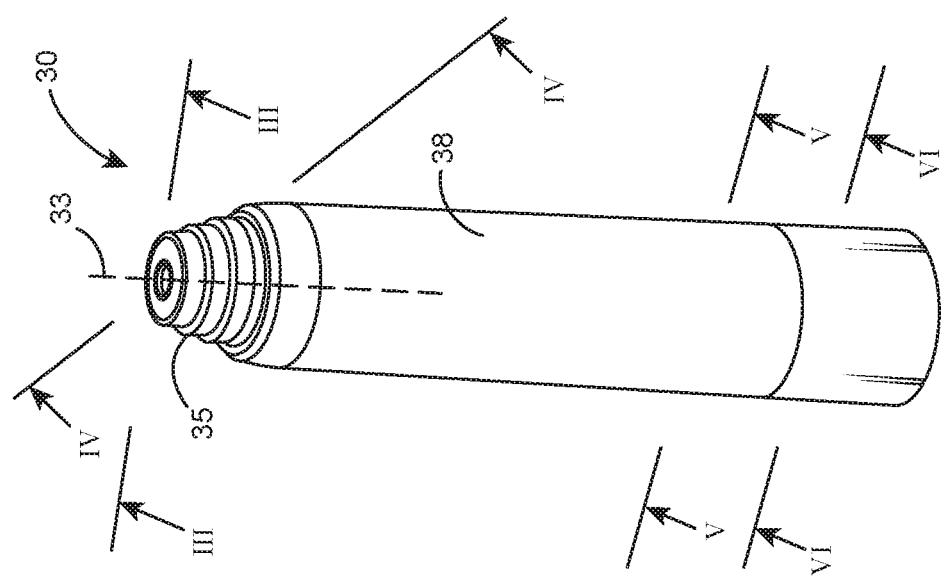
FIG. 3A is a perspective view of only a telescopic tubular couple according to the disclosure, at its closed, collapsed position.

Attention is first being made to FIGS. 1A-2B, illustrating a utility unit according to an example of the disclosure, the utility unit being a cooler-bar 10, configured as a bucket-like container having an in insulated interior space 14 defined by double walled, insulated base 16 and enveloping sidewall 18, with a carrying handle 20 and a top member 22 serving as an insulating cover and lower table top at the closed position (FIGS. 1A and 1B), and as an elevated table top, also facilitating access to the space 14 (FIGS. 2A and 2B). It is seen in FIGS. 1B, 2A and 2B that the top member 22 has at a bottom face thereof an annular rim 24 configured for resting within a corresponding flanged annular rim 26 at an inside top edge of the side wall 18, for positioning and sealing thereof.

The top member 22 is supported over a telescopic pole assembly which in the present example is a telescopic tubular couple, generally designated 30 (seen isolated in FIGS. 3A-3E), having a longitudinal axis 33, and comprising an inner segment 34 slidingly received through an outer segment 38. The telescopic tubular couple 30 is disposed within the cooler-bar 10, with the outer segment 38 articulated to the base 16, and the inner segment 34 being articulated at a bottom face of the top member 22. Articulation of the outer segment 38 to the base 16 and of the inner segment 34 to the top member 22 can take place by one or more different arrangements, such as, screw-coupling (e.g. threading 35 at the top end of the inner segment 34), snap coupling, adhering/welding, etc., or even, any of the inner segment and the outer segment can be integral with or integrated with the top member and base, respectively.

Further seen, best in FIG. 8, a bottom portion of the inner segment 34 is configured with two oppositely disposed stud openings 37, and two oppositely disposed friction enhancing member openings 39, and the outer segment 38 is configured at a top portion thereof with a pair of oppositely disposed locking openings 41, the purpose of which will become apparent hereinafter.

Figure 6A:
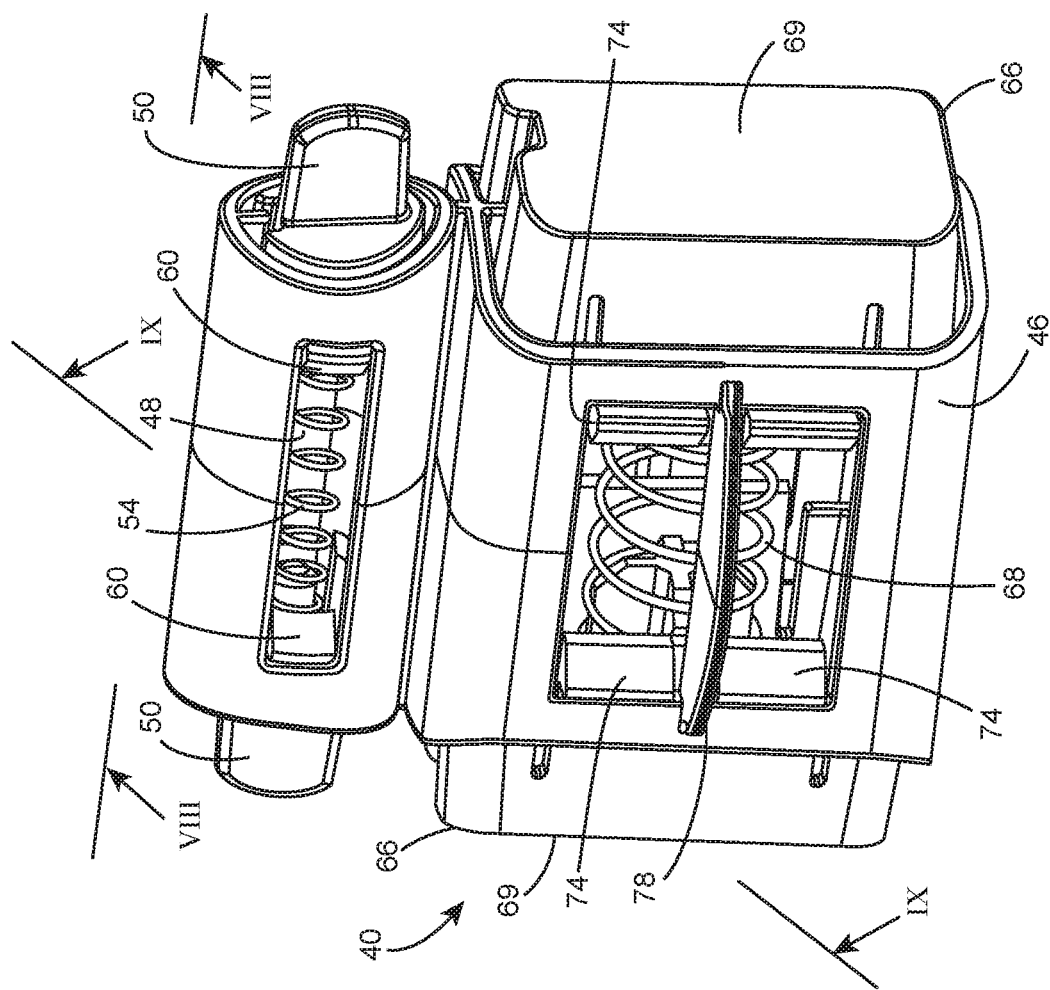
FIG. 6A is a perspective view of a combined locking and damping mechanism according to an example of the disclosure.
Figure 6C:
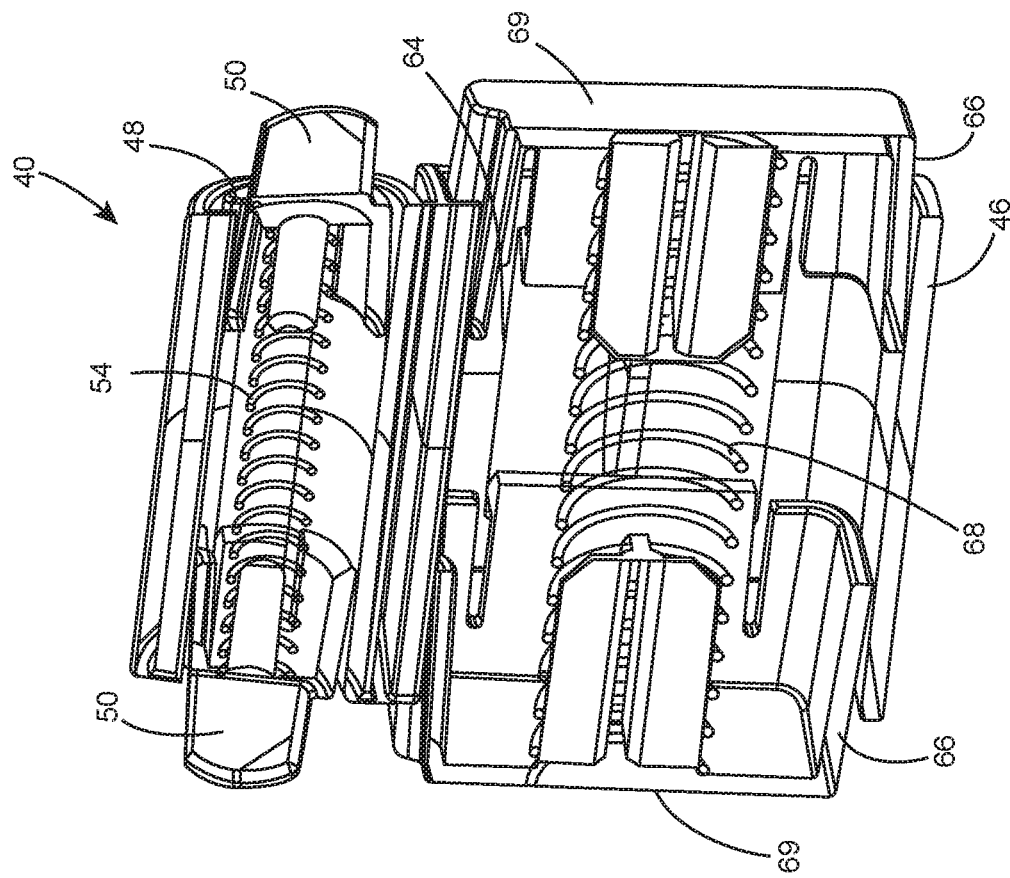
FIG. 6C is a longitudinal section along line VIII-VIII in FIG. 6A.
Figure 6B:
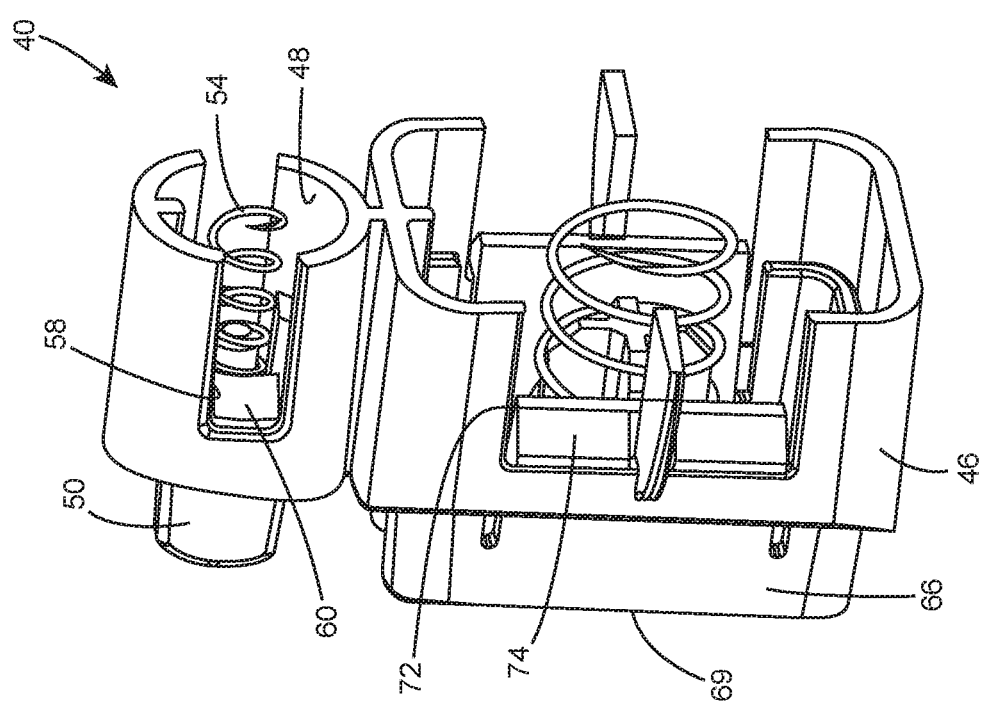
FIG. 6B is a longitudinal section along line IX-IX in FIG. 6A.
Figure 6E:
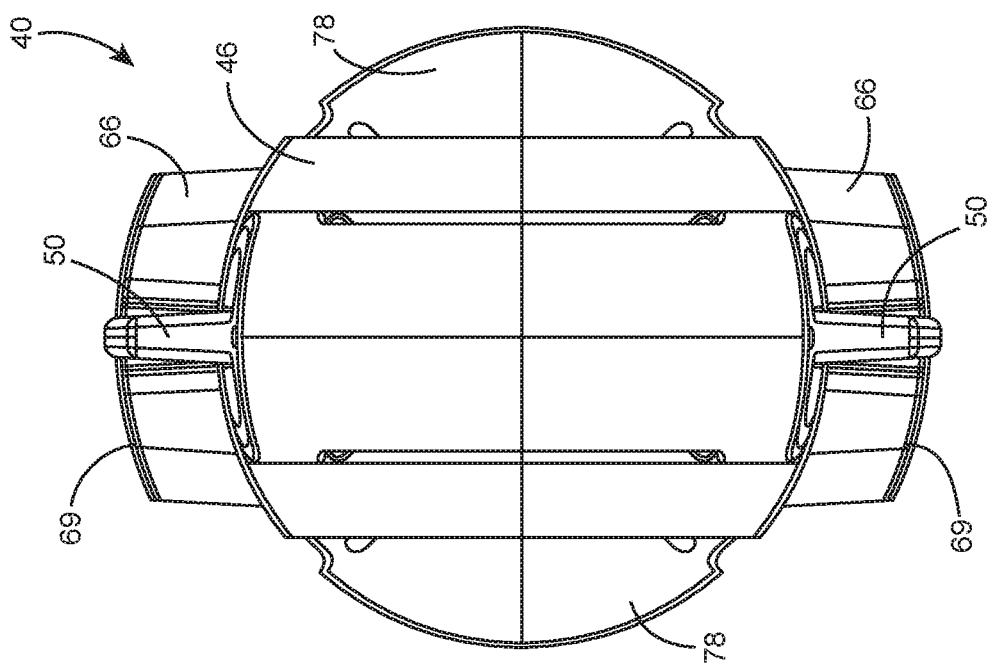
FIG. 6E is a top view of the combined locking and damping mechanism of FIG. 6A.
Figure 6D:
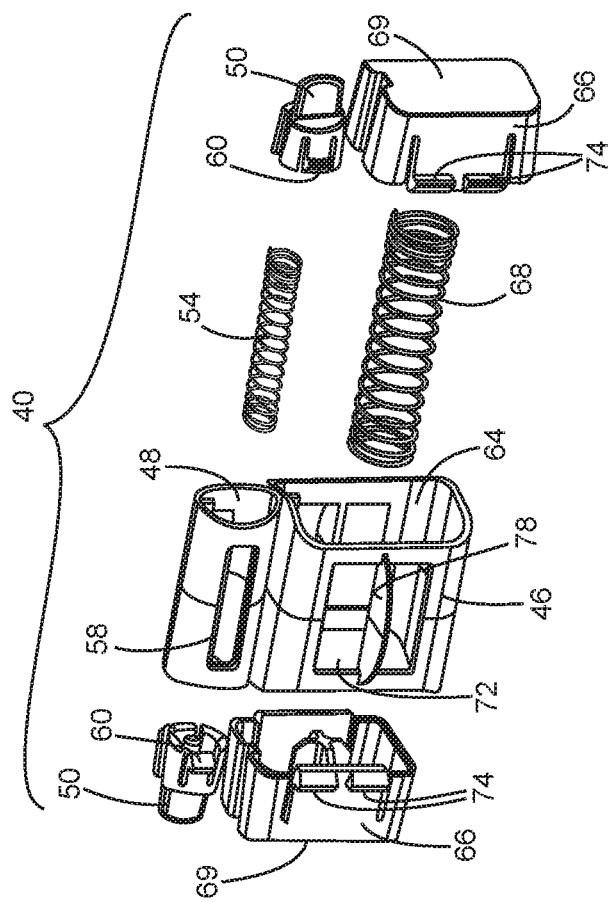
FIG. 6D is a perspective exploded view of the combined locking and damping mechanism of FIG. 6A.

As best seen in FIG. 6D, a locking and damping mechanism generally designated 40 is provided, said mechanism 40 comprising a housing 46 configured with a locking stud chamber 48 accommodating two locking studs 50, axially, slidingly disposed within the locking stud chamber 48 and outwardly biased by a biasing member (coiled spring 54 in the illustrated example) disposed between the locking studs 50. The locking stud chamber 48 is configured with a recess 58 upon which wings 60 of the locking studs 50 are snappingly secured within the locking stud chamber 48 and yet are axially displaceable within the housing between a retracted position, against the biasing effect of the spring 54, and a projecting position, as will be discussed herein after. Housing 46 is further configured with a damping chamber 64, parallelly extending with respect the locking stud chamber 48 and at the same plane, said damping chamber 64 accommodating two friction enhancing members 66, axially, slidingly disposed and outwardly biased by a biasing member (coiled spring 68 in the illustrated example). The damping chamber 64 configured with a recess 72 upon which wings 74 of the friction enhancing member 66 are snappingly secured within the damping chamber 64 and yet are axially displaceable therewithin, against the biasing effect of the coiled spring 68. Each of the friction enhancing members 66 is configured with a distal end surface 69, having an arc-sectioned shape which corresponds with an inside surface 75 of the outer segment 38.

The shape and size of the locking studs 50 corresponds with these of the stud openings 37 and locking openings 41, and the shape and size of the friction enhancing members 66 corresponds with these of the friction enhancing member openings 39.

It can further be seen, that the housing 46 is configured with laterally extending wing-like elements 78, for position and stabilize the housing within the bottom portion of the inner segment 34, said wing-like elements 78 shaped and sized such that they have an axial cross section corresponding with the inside of the inner segment 34 (e.g. as seen from a top planar view in FIG. 6E).

Figure 5B:
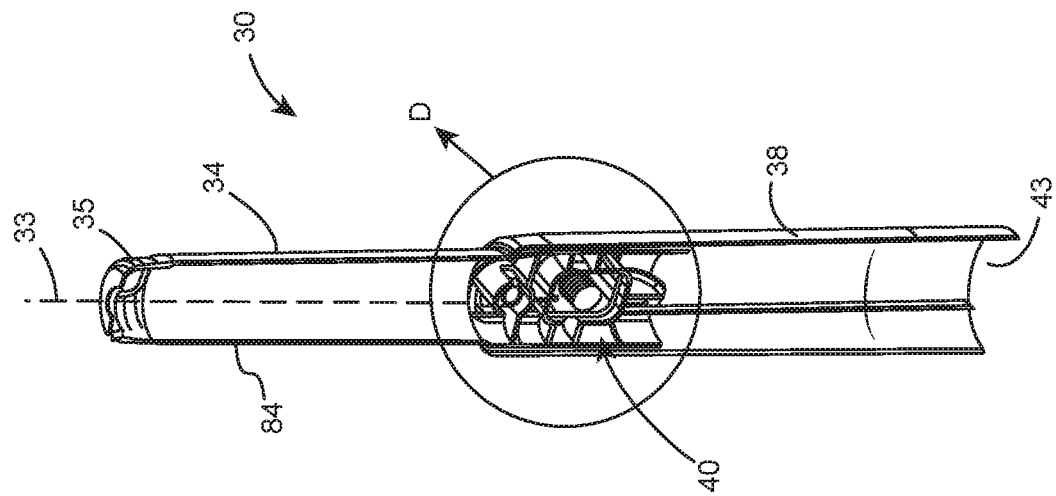
FIG. 5B is longitudinal section along line VII-VII in FIG. 5A.
Figure 5A:
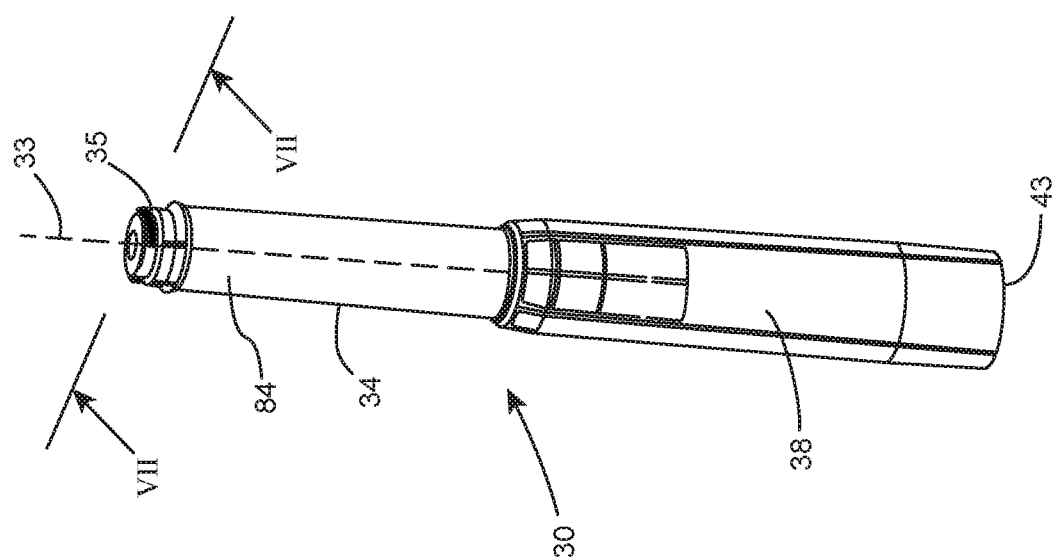
FIG. 5A is a perspective view of the telescopic tubular couple of FIG. 3A, at its open, fully expanded position.
Figure 5C:
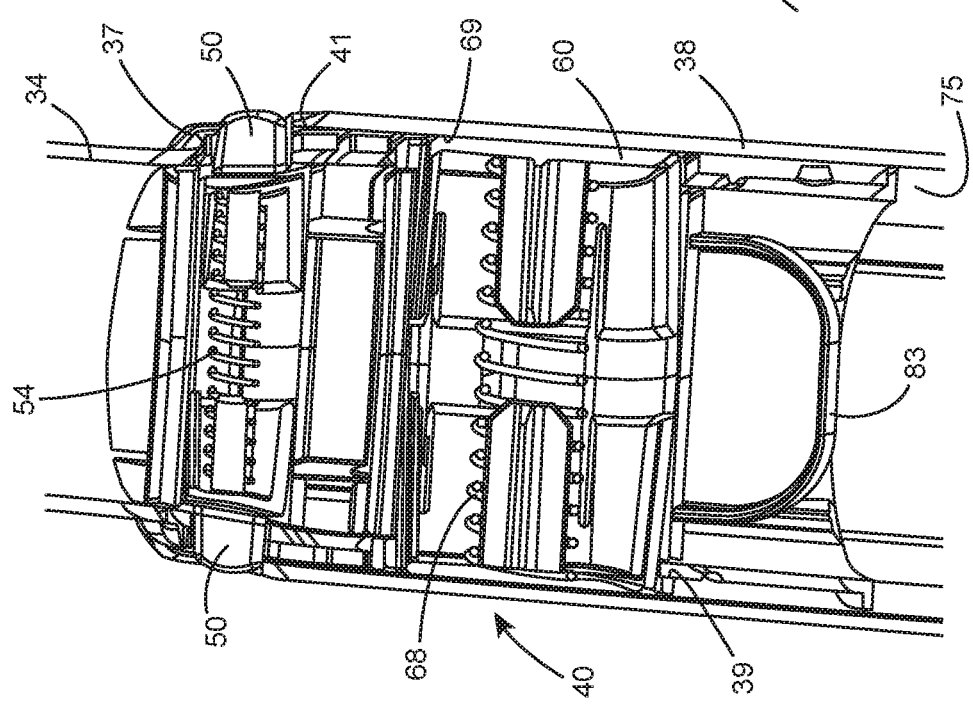
FIG. 5C is an enlargement of the portion marked D in FIG. 5B.

Upon assembling of the telescopic tubular couple 30, the housing 46 of the locking and damping mechanism 40 is articulated at the bottom of the inner segment 34 by introducing the housing through the bottom end 31 of the inner segment 34, allowing the two locking studs 50 and the two friction enhancing members 66 to snappingly engage within the stud openings 37 and the friction enhancing member openings 39, respectively, such that locking studs 50 and the friction enhancing members 66 laterally project from the outside wall surface of the inner segment 34. Then, the sub-assembled inner segment 34 is introduced into the outer segment 38 through its bottom end 43, wherein the inner segment 34 is free to axially slide within the outer segment 38 in a telescopic fashion, whereby arresting of the telescopic tubular couple 30 at the open position, fully extended position (e.g. FIGS. 5A and 5B) by pulling out the inner segment 34 until the locking studs 50 snap into the locking openings 41 configured at the top portion of the outer segment 38. In order to confirm that the locking openings 41 are disposed in register with the locking studs 50, to facilitate their spontaneous snapping into the locked, engaged position, there is provided an anti-rotation arrangement, exemplified in FIGS. 4A and 4B. For unlocking the telescopic tubular couple 30, the two locking studs 50, projecting through locking openings 41 at the top potion of the outer segment 38, are simultaneously depressed (against the biasing effect of spring 54, towards one another, thereby facilitating of the two locking studs 50 from engagement within the locking openings 41 and enabling collapsing of the telescopic tubular couple 30.

The anti-rotation arrangement is configured to prevent rotational displacement of the inner segment 34 and the outer segment 38 with respect to one another (about the coaxial longitudinal axis 33), whereby the outer segment 38 is configured at its inside surface 75 with several axially extending ribs 77 and the inner segment 34 is configured at its outside surface 84 with corresponding rails 86 disposed in register and slidingly accommodating the ribs 77, thus facilitating only axial sliding of the inner segment 34 and the outer segment 38 with respect to one another.

The arrangement is such that once the telescopic tubular couple 30 is assembled, the friction enhancing members 66 slidingly bares against at least a portion of the inside surface 75 of the outer segment 38. This gives rise to friction force, resulting in damping axial displacement speed of the inner segment 34 with respect to the outer segment 38, thus preventing spontaneous axial displacement thereof into the closed, collapsed position (e.g. FIGS. 3A-3C). Thus, displacing the telescopic tubular couple 30 into the extracted, open position, requires some pulling force, in order to overcome the friction residing between the elements. On the other hand, displacing the telescopic tubular couple 30 into the closed, retracted position, is not spontaneous under gravity force, but rather requires at least an initial displacement, so as to over come the static friction.

It is appreciated that the friction force extending between the friction enhancing members 66 and the inside surface 75 of the outer segment 38 can be configured so as to take into consideration the self weight of the inner segment 34 and any additional load applied thereto, e.g. top member 22, as well as friction parameters, and also for tolerance compensation. However, wherein the top member 22, or any other element supported by the telescopic tubular couple 30, does not fall down in a slamming fashion and even more so, reduces unexpected displacement/closure thereof, thus eliminating or reducing the likelihood of injury.

The locking and damping mechanism 80 illustrated in FIG. 7 is similar to the locking and damping mechanism 40 discussed herein above, however wherein it comprises several support wings 82 and a manipulating member 83 facilitating introducing the locking and damping mechanism 80 into the inner segment. Apart for theses differences, locking and damping mechanism 80 is similar to locking and damping mechanism 40 and like reference numbers are used for describing elements.

Turning now also to FIGS. 9A-10B, illustrated is a cooler bar 90 similar by concept to the mini-cooler bar 10 illustrated hereinbefore, and reference is made thereto, wherein primary like-elements are designated with like reference-numbers however shifted by 100.

The significant difference however resides in that the cooler bar 90 comprises two telescopic tubular couples, each designated 92, whereby there is no need for an anti-rotation arrangement (configured to prevent rotational displacement of the inner segment and the outer segment with respect to one another, as in the previous example), since both the outer segments 138 are articulated to the base 116 of the cooler bar, and both the inner segments 134 are articulated to the top member 122, whereby the two members of the telescopic tubular couple 130 are prevented from rotating with respect to one another (about their coaxial longitudinal axis 133).

It is appreciated that the cooler bars illustrated in the examples hereinabove are provided for exemplification only, and that other utility units can be configured with one or more telescopic tubular couples according to the disclosure. Also, the number of telescopic segments of a telescopic tubular couple can be two or more.

The invention claimed is:

1. A telescopic tubular couple configured with an inner segment slidingly received through an outer segment of the telescopic tubular couple; and a locking and damping mechanism comprising a housing articulated at a bottom portion of the inner segment, said housing comprising a locking stud chamber accommodating at least one locking stud biased to laterally project from the housing through a stud opening disposed in register at the bottom portion of the inner segment, and a damping chamber accommodating at least one friction enhancing member normally projecting from the housing and configured for sliding engagement about an inside surface of the outer segment; and said telescopic tubular couple is configurable between a closed position at which the inner segment is retracted and at least partially received within the outer segment and wherein the at least one locking stud is disengaged from a locking opening at the outer segment, though remains projecting through the stud opening, and at least one open, expanded position, at which the inner segment is at least partially withdrawn from the outer segment and wherein the at least one locking stud is engaged within the locking opening at a top portion of the outer segment; wherein the locking stud chamber is configured with two coaxially disposed locking studs, laterally biased at opposite directions; and wherein displacing the telescopic tubular couple between the open position and the closed position entails friction forces between the at least one friction enhancing member and the inside surface of the outer segment.

2. The telescopic tubular couple of claim 1, wherein the damping chamber is configured with two coaxially disposed friction enhancing members, laterally biased at opposite directions.

3. The telescopic tubular couple of claim 1, wherein the at least one friction enhancing member is displaceable along a second axis intersecting a longitudinal axis of the telescopic tubular couple.

4. The telescopic tubular couple of claim 1, wherein the housing is configured with external supports for positioning and stabilizing the housing within the bottom portion of an inner segment of a telescopic tubular couple.

5. The telescopic tubular couple of claim 1, wherein the at least one locking stud is configured for displacement between a normally outward projecting position, and a retracted position.

6. The telescopic tubular couple of claim 1, wherein at least one of (i) the at least one locking stud and (ii) the at least one friction member is configured for snap mounting within the housing.

7. The telescopic tubular couple of claim 1, wherein at least the locking stud chamber of the housing of the locking and damping mechanism is disposed within the inner segment of a telescopic tubular couple, and wherein the inner segment is configured with a corresponding stud opening for each of the at least one locking studs, said stud openings disposed in register with the locking studs.

8. The telescopic tubular couple of claim 1, wherein the housing is articulated within the bottom portion of an inner segment of a telescopic tubular couple, by the at least one locking stud projecting through the stud opening at the bottom portion of the inner segment.

9. The telescopic tubular couple of claim 1, wherein the damping chamber is disposed within the inner segment of the telescopic tubular couple, whereby the inner segment is configured with a corresponding opening for each of the at least one friction enhancing member, said openings disposed in register with the friction enhancing member.

10. The telescopic tubular couple of claim 1, wherein the at least one locking stud is biased into lateral projection by a biasing member disposed within the locking stud chamber of the housing.

11. The telescopic tubular couple of claim 1, wherein the at least one friction enhancing member is biased into lateral projection by a friction enhancing biasing member disposed within the damping chamber of the housing.

12. The telescopic tubular couple of claim 1, wherein the at least one friction enhancing member is configured with a friction enhancing portion extending parallel to the inside surface of the outer segment and configured for engaging the inside surface of the outer segment of the telescopic tubular couple.

13. The telescopic tubular couple of claim 1, wherein an aligning arrangement is configured for preventing rotation of any one of the inner segment and the outer segment about the longitudinal axis of the telescopic tubular couple.

14. The telescopic tubular couple of claim 1, wherein the housing of the locking and damping mechanism is configured with at least a portion having a cross-section similar to the bottom portion of the inner segment, and configured for snug receiving therein.

15. The telescopic tubular couple of claim 1, wherein axial displacement of the inner segment into the open, extended position, entails sliding displacement of the at least one locking stud along at least a portion of the inside surface of the outer segment, until it snaps into locking engagement within the corresponding locking opening.

16. The telescopic tubular couple of claim 1, wherein the housing of the locking and damping mechanism is integral with, or articulatable to, the inner segment of a telescopic tubular couple.

17. The telescopic tubular couple of claim 1, wherein a pair of oppositely disposed friction enhancing members are coaxially disposed within the damping chamber of the housing, and operating in opposite senses against a common biasing member.

18. The telescopic tubular couple of claim 1, wherein locking of the telescopic tubular couple at the open position is spontaneously facilitated by snap engagement of the at least one stud into the locking openings configured at the outer segment, wherein such locking takes place upon axial extraction of the inner segment with respect to the outer segment, however when the locking stud extends opposite and in register with the locking opening and with the stud opening.

19. The telescopic tubular couple of claim 1, wherein unlocking the telescopic tubular couple takes place by depressing the at least one stud projecting through the locking opening so as to disengage therefrom, however not beyond the stud opening, thereby facilitating axial displacement of the inner segment with respect to the outer segment.

20. The telescopic tubular couple of claim 1, wherein displacement of the telescopic tubular couple into at least the closed position, generates friction forces caused by the at least one friction enhancing member displacing against the inside surface of the outer segment, said friction forces resulting in damping axial displacement speed and preventing spontaneous displacement of the inner segment with respect to the outer segment.

21. A utility unit comprising at least one telescopic pole assembly comprising at least a telescopic tubular couple according to claim 1, and a combined locking and damping mechanism.

22. A telescopic pole assembly comprising at least a telescopic tubular couple according to claim 1, and a combined locking and damping mechanism.

* * * * *